Oct. 16, 1962 R. H. FIELD 3,058,686

MOUNTING HUB

Filed Feb. 4, 1960

INVENTOR:
RICHARD H. FIELD

BY Howson & Howson

ATTYS.

United States Patent Office 3,058,686

Patented Oct. 16, 1962

3,058,686

MOUNTING HUB

Richard H. Field, Broomall, Pa., assignor, by mesne assignments, to Sperry Rand Corporation, a corporation of Delaware Filed Feb. 4, 1960, Ser. No. 6,749
4 Claims. (Cl. 242—68.3)

The present invention relates to new and useful improvements in mounting hubs and the like specifically designed for receiving and holding a tape reel or the like.

The mounting hub of the present invention is particularly adapted for use in conjunction with automatic computers such as the Univac Machine wherein information is fed into the machine by means of magnetic tapes and is recorded by the machine on magnetic tapes. When operating a Univac Machine, the operator of the machine may be constantly changing tape reels on the various machine units. The prior mounting hubs used for this purpose are relatively complex and do not lend themselves to easy and rapid movement and replacement of reels. Further, prior mounting hubs of this type necessitated grabbing the reel by its flange portion and pulling the reel off of the hub against the pressure of the retaining means. In some instances the reel was mounted flush against the face of the machine making it difficult for the operator to grasp and remove the reel while in other instances the force applied to the reel by the operator sometimes resulted in broken or damaged tape reels.

The mounting hub of the present invention permits a tape reel to be merely pushed on to the machine with a minimum of lost time. Also the mounting hub of the present invention permits the operator to release the restraining means in the mounting hub holding the reel in position by merely pressing a button and thereafter the reel may be pulled off of the mounting hub by the operator easily and quickly without the restraining means resisting removal of the mounting hub. This conception permits the operator of a Univac machine, for example, to change both reels with a minimum of lost time.

With this foregoing in mind, a primary object of the present invention is to provide a novel mounting hub or the like wherein a tape reel may be easily forced on to the mounting hub and readily removed from the mounting hub without urging the tape reel against the reel restraining means during removal operation.

Another object of the present invention is to provide a novel mounting hub which may be readily substituted for presently existing mounting hubs of this type.

A further object of the present invention is to provide a novel mounting hub wherein the restraining means for the tape reel may be readily released by the operator of the machine so that the tape reel may be easily removed from the mounting hub, and wherein the restraining means, upon removal of the tape reel, are automatically positioned to receive a second tape reel.

A still further object of the present invention is to provide a novel mounting hub having the features and characteristics set forth above which is of relatively simplified construction, may be manufactured easily and cheaply, and is entirely efficient and effective in operation.

These and other objects of the present invention and the various features and details of operation and construction thereof are hereinafter more fully set forth and described with reference to the accompanying drawings wherein.

Figures 1, 2, 3, 4, 5, 6, 7:
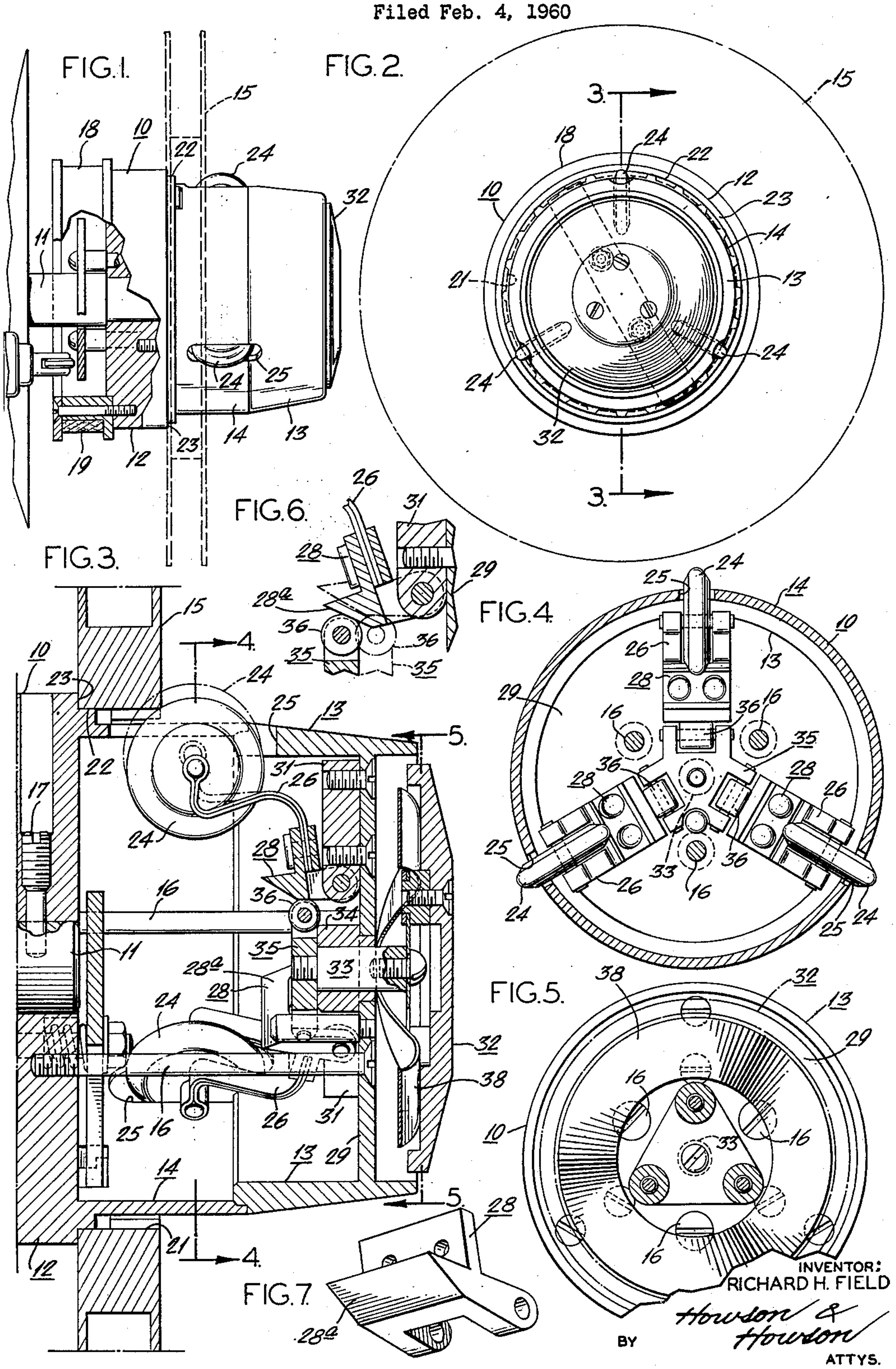
FIG. 1 is a side elevational view partially in section illustrating a mounting hub made in accordance with the present invention with a tape reel shown in broken lines in position on the mounting hub.
FIG. 2 is a front view of the mounting hub of FIG. 1.
FIG. 3 is an enlarged longitudinal sectional view taken along lines 3—3, FIG. 2 illustrating the construction of a mounting hub made in accordance with the present invention.
FIG. 4 is a transverse sectional view taken along lines 4—4, FIG. 3.
FIG. 5 is a fragmentary view of a portion of the mounting hub of the present invention taken along lines 5—5, FIG. 3.
FIG. 6 is an enlarged fragmentary sectional view illustrating the position of the means for mounting the restraining wheels of the mounting hub in the released or nonrestraining position.
FIG. 7 is a perspective view of a mounting member for the restraining wheels of the mounting hub.

Referring more specifically to the drawings, reference numeral 10 designates generally a mounting hub made in accordance with the present invention secured to the hub shaft 11 of a Univac machine or the like (not shown). The mounting hub 10 comprises a generally cylindrical base member 12 and a general frusto conical cap member 13 which is removably secured to the base member 12 and which tapers inwardly toward its outer or forward end. Intermediate the base member 12 and frusto conical cap member 13 is an annular sleeve 14 which, may be formed integrally with the base 12, and is of lesser diameter than the base 12 but of the same diameter as the inner end of the cap member 13 so as to present a smooth outer surface to the forward end of the mounting hub over which a contventional tape reel 15 may pass.

The cap member 13 is removably secured to the base 12 of the mounting hub in engagement with the forward end of the annular sleeve, for example, as shown in FIG. 3, by means of a plurality of bolts 16 which pass through the cap 13 and are threadedly received in the base 12. The base 12 in turn is fixed to the forward end of the hub shaft 11 in any conventional manner, for example, by means of one or more set screws 17 which may be threaded into the base and into engagement with the shaft 11. Fixed to the rear surface of the base of the mounting hub is a conventional brake drum 18 which may have a cork or other friction facing 19 thereon adapted to be engaged by conventional brake shoes (not shown) mounted in the Univac machine to cause instantaneous stopping of rotation of the hub 10.

The tape reel 15 illustrated in the drawings is the conventional tape reel used for holding magnetic tape or the like for a Univac or similar machine. The tape reel has a central opening 21 therein which passes over the cap 13 and sleeve 14 of the mounting hub and engages an integral stepped portion 22 of the base 12 formed at the junction between the base and the sleeve 14. This stepped portion of the base provides a centering and supporting surface for the tape reel and serves to position the tape in the desired position relative to the axis of the hub shaft 11.

According to the present invention, means are provided to maintain the tape reel 15 in the desired position on the base 12 and in engagement with the forward wall 23 of the base. To accomplish this, a plurality of spring biased detent wheels 24 are positioned within the mounting hub 10 and adapted to project outwardly through longitudinal slots 25 formed in the sleeve 14 into engagement with the tape reel to resiliently maintain the tape reel in the desired position. Preferably three detent wheels 24 are provided even though it is readily apparent that any number of detent wheels may be used. These detent wheels 24 are resiliently urged radially outward beyond the periphery of the annular sleeve 14 into engagement with the tape reel, for example, by means of a plurality of leaf springs 26 with one leaf spring being provided for each detent wheel. Each leaf spring 26 is shaped as illustrated in FIG. 3 of the drawing comprising a continuous strip of spring metal reversely bent upon itself to encircle the shaft of the detent wheel and support the same. A portion of each leaf spring 26 extends substantially parallel with the axis of the mounting hub and terminates in an inwardly extending portion secured to a pivoted arm, as more fully described hereinafter, so that the detent wheel may be resiliently urged radially inwardly through the slots in the sleeve 14.

An important feature of the present invention is the provision of means for releasing the reel restraining members or detent wheels 24 so that the tape reels may be easily removed from the mounting hub without having to overcome the restraining force of the detent wheels 24. This is accomplished in the illustrated embodiment of the present invention by pivotally mounting the inner end of the springs 26, which carry the detent wheels, for movement between an outer limit position wherein the detent wheel is in engagement with the tape reel and exerts a restraining force on the tape reel and an inner limit position wherein the detent wheel is out of the path of travel of the tape reel so that the tape reel may be readily removed from the mounting hub. Additionally, in the illustrated embodiment of the present invention means are provided to defer the movement of the detent wheels between their outer and inner positions so that the operator of the machine may readily actuate the detent wheels from their outer position to their inner position permitting removal of the tape reel and so that upon removal of the tape reel the detent wheels will automatically be returned to their outer limit position preparing the mounting hub for the reception of a new tape reel.

With reference to FIGS. 3 and 6 of the drawings, the inner end of each leaf spring 26 is fixed to a separate pivoted arm 28 which in turn is pivotally mounted to the forward wall 29 of the cap member 13 for example, by means of a lug 31 which is secured to the inner face of the forward wall of the cap member. Actuation of the pivoted arms 28 between their outer and inner positions corresponding to the outer and inner limit positions of the detent wheels 24 is accomplished by means of a release button 32 mounted at the forward face of the cap 13 for movement axially with respect to the mounting hub. The release button 32 is carried by a stud shaft 33 slidably received within the central opening of a bushing 34 secured to the forward wall 29 of the cap member 13, as illustrated in FIG. 3. Fixed to the inner end of the stud shaft 33 is a yoke 35 which carries a plurality of rollers 36 positioned in engagement with the inner surfaces of the pivoted arms 28. When the release button is in its outer position as illustrated in FIG. 3. of the drawings, the rollers 36 are so positioned relative to the pivoted arms 28 that the detent wheels 24 are in their outermost extended position. Upon inward movement of the release button 32, the rollers 36 move inwardly along a cam surface **28*a* on the pivoted arms 28 permitting the latch members to pivot inwardly as illustrated in FIG. 6 of the drawings whereby decreasing outward pressure of the springs 26 on the detent wheels 24 permits the detent wheels 24 to be moved inwardly. This eliminates the restraining force on the reel carried by the mounting hub permitting the reel to be readily removed from the mounting hub. An annular leaf spring 38 is provided intermediate the rearward wall of the release button 32 and the forward wall 29 of the cap, normally urging the release button toward its extreme forward position. After the reel is removed from the mounting hub the annular leaf spring 38 will force the release button forwardly thereby again positioning the detent wheels 24** for reception of another reel.

From the above, it will be seen that the present invention provides a novel mounting hub having means therein wherein the restraining force of the reel carried by the mounting hub may be readily released thereby permitting the reel to be easily removed from the mounting hub, and wherein after the reel is removed from the mounting hub the mounting hub is again positioned automatically to receive another reel.

While a particular embodiment of the present invention has been illustrated and described herein, it is not intended to limit the invention to such a disclosure and changes and modifications may be incorporated and embodied therein within the scope of the following claims:

I claim:

1. A mounting hub for tape reels and the like comprising; a base member, means on said base member defining a centering and supporting surface operable to receive and position a tape reel relative to said hub, an annular sleeve carried by said base member concentrically therewith and projecting forwardly from one end thereof, said annualr sleeve being positioned adjacent said centering and supporting surface, means defining a plurality of circumferentially spaced openings in said sleeve, a plurality of detent wheels each mounted in said sleeve operable to be projected radially outward through one of said openings beyond said centering and supporting surface into engagement with said tape reel and maintain said tape reel in position on said centering and supporting surface, separate spring means connected to each of said detent wheels, an arm secured to each of said spring means, a release button, a yoke carried by said release button in engagement with each of said arms, means mounting said release button for movement axially of said sleeve between opposite limit positions, said yoke operable in one limit position of said release button to maintain said arms in a position to tension said spring means wherein said detent wheels extend through said openings beyond the peripheral surface of the annular sleeve and retain said tape reel on the centering and supporting surface and operable in the other limit position of said release button to release said arms for movement to positions wherein said detent wheels are within the confines of said annular sleeve, permitting said tape reel to be removed from said hub.

2. A mounting hub for tape reels and the like comprising; a base member, means defining a centering and supporting surface on one end of said base member operable to receive and position a tape reel relative to said hub, an annular sleeve projecting outwardly from said one end of said base member, an arm, means pivotally mounting said arm relative to said sleeve for pivotal movement between opposite limit positions in a direction substantially radially of said sleeve, a member adapted to be projected outwardly beyond said annular sleeve and beyond said centering and supporting surface operable to engage said tape reel and maintain said tape reel in position on said centering and supporting surface, spring means interconnecting said member and said arm to maintain said member outwardly beyond said centering and supporting surface in one limit position of said arm and to maintain said member inwardly of said centering and supporting surface in the other limit position of said arm, and an actuator positioned in engagement with said arm and movable between first and second limit positions, said actuator operable in the first limit position thereof to maintain said arm in its said one limit position and said actuator, in the second limit position thereof, permitting said arm to move to its said other limit position.

3. Apparatus in accordance with claim 2 wherein second spring means are provided to normally maintain said actuator in its said first limit position.

4. Apparatus in accordance with claim 2 wherein a release button is mounted for sliding movement at the forward end of said annular sleeve, means interconnecting said release button and said actuator, and second spring means positioned intermediate said annular sleeve and said release button operable to normally maintain said actuator in its said first limit position.

(References on following page)

References Cited in the file of this patent

UNITED STATES PATENTS

| | | |
|---|---|---|
| 696,137 | Felbel et al. | Mar. 25, 1902 |
| 1,105,963 | Clem | Aug. 4, 1914 |
| 2,042,171 | Durand et al. | May 26, 1936 |
| 2,696,950 | Ranger | Dec. 14, 1954 |
| 2,762,645 | Bordner | Sept. 11, 1956 |
| 2,882,078 | MacDonald | Apr. 14, 1959 |
| 2,928,620 | Stavrakis et al. | Mar. 15, 1960 |

FOREIGN PATENTS

| | | |
|---|---|---|
| 1.097.921 | France | Feb. 23, 1955 |

UNITED STATES PATENT OFFICE

CERTIFICATE OF CORRECTION

Patent No. 3,058,686 October 16, 1962

Richard H. Field

It is hereby certified that error appears in the above numbered patent requiring correction and that the said Letters Patent should read as corrected below.

Column 2, line 30, for "contventional" read -- conventional --; column 3, lines 57 and 58, for "latch members" read -- pivoted arms --; column 4, line 16, for "annualr" read -- annular --.

Signed and sealed this 12th day of March 1963.

(SEAL)
Attest:

ESTON G. JOHNSON
Attesting Officer

DAVID L. LADD
Commissioner of Patents